United States Patent [19]

Hirosawa

[11] Patent Number: 5,226,098
[45] Date of Patent: Jul. 6, 1993

[54] METHOD OF AND APPARATUS FOR GENERATING IMAGE DATA REPRESENTING INTEGRATED IMAGE

[75] Inventor: Makoto Hirosawa, Kyoto, Japan

[73] Assignee: Dainippon Screen Mfg. Co., Ltd., Kyoto, Japan

[21] Appl. No.: 702,478

[22] Filed: May 20, 1991

[30] Foreign Application Priority Data

May 29, 1990 [JP] Japan .................. 2-139233

[51] Int. Cl.$^5$ ............................................. H04N 1/387
[52] U.S. Cl. ...................................... 382/61; 358/450; 358/453; 395/117
[58] Field of Search .................. 382/61; 358/450, 453, 358/462; 364/519, 520; 395/106, 109, 112, 115, 116, 117, 128

[56] References Cited

U.S. PATENT DOCUMENTS

| | | | |
|---|---|---|---|
| 4,476,497 | 10/1984 | Oshikoshi et al. | 382/61 |
| 4,896,208 | 1/1990 | Moriya et al. | 358/450 |
| 4,949,188 | 8/1990 | Sato | 358/448 |
| 5,001,653 | 3/1991 | Bachanan et al. | 364/519 |
| 5,014,124 | 5/1991 | Fujisawa | 358/462 |
| 5,129,048 | 7/1992 | Ng | 395/110 |
| 5,129,049 | 7/1992 | Cuzzo et al. | 395/113 |

FOREIGN PATENT DOCUMENTS

| | | |
|---|---|---|
| 0122430 | 3/1984 | European Pat. Off. . |
| 0326137 | 1/1989 | European Pat. Off. . |
| 1184580 | 7/1981 | Japan . |
| 63-212273 | 2/1987 | Japan . |
| 1276971 | 11/1989 | Japan . |

OTHER PUBLICATIONS

"Techniques for Preparing and Interchanging Mixed Text-Image Documents at Multifunctional Workstations" by W. H. G. Kronert, 8173 Siemens Forschuncs, vol. 12 (1983), No. 1.

*Primary Examiner*—Michael T. Razavi
*Assistant Examiner*—Steven P. Klocinski
*Attorney, Agent, or Firm*—Lowe, Price, LeBlanc & Becker

[57] ABSTRACT

An image plane (IP) is divided into a plurality of strip regions ($R_1$-$R_{11}$). Inputted are image data of image elements to be integrated on the image plane, i.e., images of characters, diagrams and pictures. The strip regions are serially selected and it is determined what image elements are included in the selected strip region.

When the selected region includes characters and/or diagrams only, these image elements are integrated in a high resolution and in 1 bit for each pixel. When the selected region includes pictures only, on the other hand, the images of pictures are integrated in a low resolution and in 8 bits for each pixel. Further, if the region includes all the types of the image elements, the integration of the image elements are conducted at a high resolution and in 8 bits for each pixel.

26 Claims, 6 Drawing Sheets

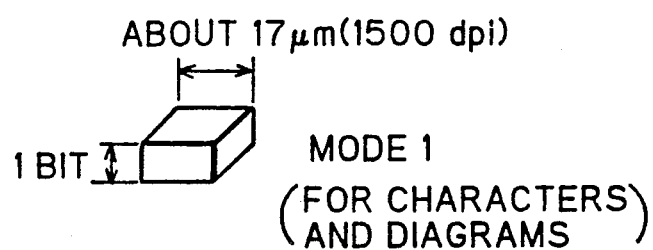
FIG.3(a) — MODE 1 (FOR CHARACTERS AND DIAGRAMS)
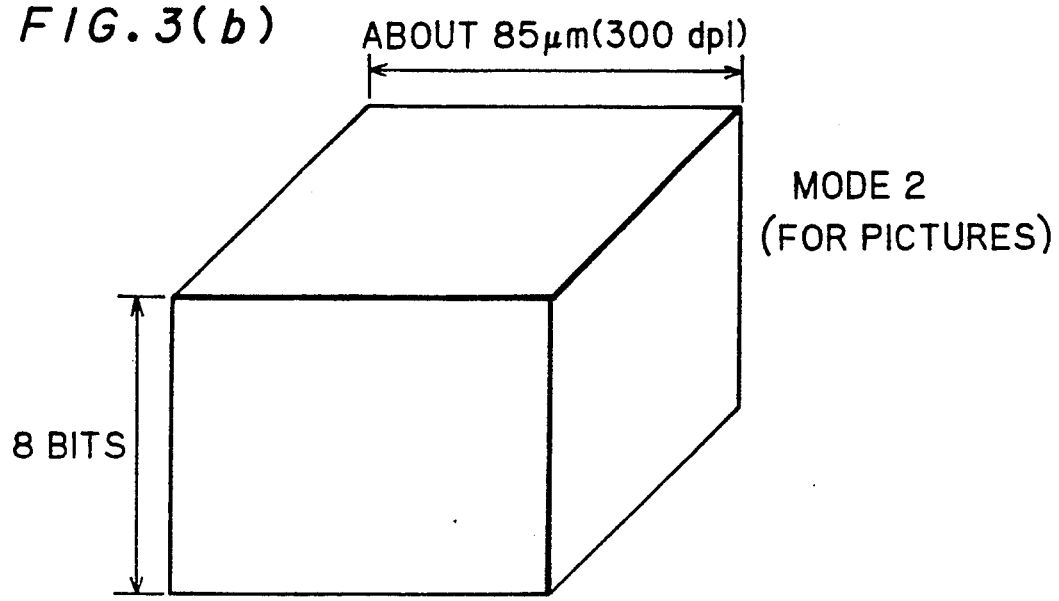
FIG.3(b) — MODE 2 (FOR PICTURES)
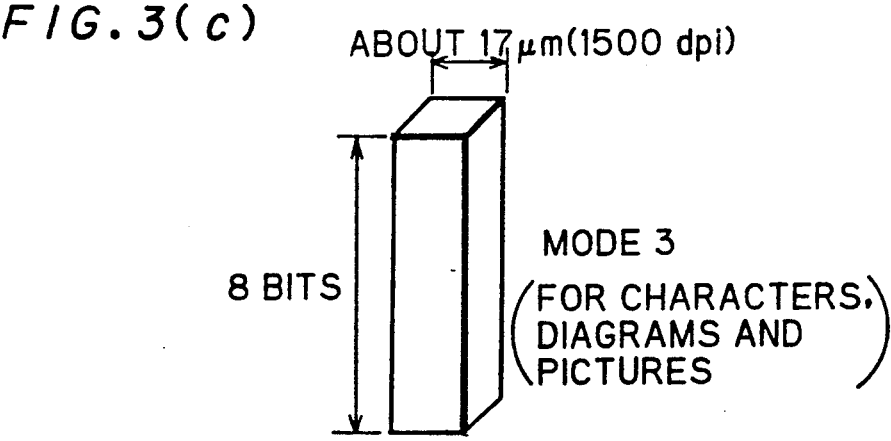
FIG.3(c) — MODE 3 (FOR CHARACTERS, DIAGRAMS AND PICTURES)

METHOD OF AND APPARATUS FOR GENERATING IMAGE DATA REPRESENTING INTEGRATED IMAGE

BACKGROUND OF THE INVENTION

1. Field of the Invention

The present invention relates to a method and an apparatus for generating an image data representing an integrated image, and more particularly, to an improvement in integrating respective images of a character, diagram and a picture to generate a halftone dot image data or a binary image data of an integrated image and deliver the same to an output device such as an image scanner.

2. Description of the Background Art

Some current personal computers and work stations are capable of generating an image including characters, diagrams and pictures and transforming the image into a page description language. Such an image is called an "integrated image". Page description language is a language for describing shapes, colors and locations of the characters, diagrams and pictures in accordance with a specific program grammar and an example thereof is a language "Post Script". A program described in a page description language is called "image description program" hereinafter.

FIG. 6 is a block diagram showing an image processing system for generating an image in accordance with an image description program. The image processing system comprises a host processor 10, an image integrating device 20 and an output device 30.

The host processor 10 receives an image description program $P_i$, a multi-tone image data $D_i$ expressing multi-tone image of a picture and the like through an external interface 13 from an external device (not shown) and decodes the image description program $P_i$ to produce vector data $V_l$ and $V_f$ expressing characters and diagrams, respectively. To the host processor 10, a character font disc 11 for storing character fonts and an image data memory 12 for temporarily storing a multi-tone image data are connected.

The vector data $V_l$ and $V_f$ and the multi-tone image data $D_i$ are transmitted from the host processor 10 to data management unit 21 in the image integrating device 20. The data management unit 21 has a function to control the whole operation of the image integrating device 20.

The vector data $V_l$ and $V_f$ and the multi-tone image data $D_i$ are delivered from the data management unit 21 to the data processing unit 22. The data processing unit 22 performs a coordinate transformation with regard to these data, and additionally, it transforms the vector data $V_l$ and $V_f$ into a raster data $R_l$ and $R_f$, respectively. The raster data $R_l$ and $R_f$ and the multi-tone image data $D_{ia}$ obtained in the data processing unit 22 are supplied to a dot generator (a halftone dot image generating unit) 23 and transformed into a halftone image data $D_h$. The halftone dot image data $D_h$ expresses respective ON/OFF states of halftone dots, in which a single bit is asssigned to each dot cell in each color component. The "dot cell" is respective ones of unit areas forming one halftone dot and the color component is respective ones of R (red), G (green) and B (blue), for example.

The halftone dot data $D_h$ is temporarily stored in an output frame memory 24 in which 1 bit is assigned to each dot cell in each color component, and thereafter, it is outputted to an output device 30 to display or record an integrated halftone dot image.

In the conventional image integrating device 20, the character raster data $R_l$, the diagram raster data $R_f$ and the multi-tone image data $D_{ia}$ are separately applied to the dot generator 23, and then a data processing to produce the halftone dot data $D_h$ is performed. For this reason, all of the data $R_l$, $R_f$ and $D_{ia}$ are processed under the common condition where resolution is set at the highest resolution in respective data $R_l$, $R_f$ and $D_{ia}$ and number of gradation levels is set at the maximum number of gradation levels in respective data $R_l$, $R_f$ and $D_{ia}$. The maximum number of gradation levels is the maximum one of respective numbers of bits expressing optical density levels in the data $R_l$, $R_f$ and $D_{ia}$, for example.

Thus, an efficiency of processing the image data is not necessarily high and there arises the problem that the processing is slow or an efficiency in using an output frame memory is low.

The dot generator 23 generates the halftone dot data $D_h$ by comparing optical density levels of the pixels expressed by the data $R_l$, $R_f$ and $D_{ia}$, respectively, with threshold values or screen pattern data for each pixel in each scanning line. The screen pattern data is previously stored in the dot generator 23. Now then, regions to which characters, diagrams and pictures to be allocated on an imaging plane are often not rectangular. In the prior art, in order to produce a halftone dot data on a region that is not rectangular, it is required that the head coordinates on an image plane in respective main scanning lines in the region is transformed into addresses of the screen pattern data or coordinates on a screen pattern plane, and the screen pattern data is read in accordance with the address. Such a transformation processing is a very complex one, and thus, there arises the problem that a processing speed is lowered in the dot generator 23.

SUMMARY OF THE INVENTION

The present invention is directed to a method of generating an integrated image including plural types of image elements.

According to the present invention, the method comprises the steps of: (a) obtaining respective image data representing respective image elements in respective resolutions and in respective data length for each pixel; (b) designating positions of the image elements on an image plane on which an integrated image is to be defined; (c) dividing the image plane into a plurality of regions; (d) selecting one of the plurality of regions to obtain a selected region; (e) determining what image elements are included in the selected region, to thereby specify objective image elements; (f) determining maximum resolution and maximum data length within respective resolutions and data length of the objective image elements; (g) integrating on the selected region the objective image elements in the maximum resolution and in the maximum data length to obtain a part of an integrated image data representing a part of the integrated image defined on the selected region; and (h) repeating the steps (d) through (g) while serially changing the selected region within the plurality of regions, to thereby obtain the integrated image data representing the whole of the integrated image on the image plane.

Preferably, the method further comprising the step of: (i) prior to the step (a), determining a plurality of image-integration modes characterized by different resolutions and different data length.

In accordance with the step (i), the step (g) comprises the steps of: (g-1) selecting one of the plurality of image-integration modes in accordance with the maximum resolution and the maximum data length, to thereby specify a selected image-integration mode; and (g-2) integrating on the selected region the objective image elements in the selected image-integration mode to obtain the part of the integrated image data.

The image elements may be classified into a plurality of image types including multi-tone image type and binary image type.

The plurality of image-integration modes may include first through third image-integration modes. The first image-integration mode is characterized by relatively high resolution and relatively small data length for each pixel, while the second image-integration mode is characterized by relatively low resolution and relatively large data length for each pixel. Further, the third image-integration mode is characterized by relatively high resolution and relatively large data length for each pixel.

The present invention is also directed to an apparatus for generating an integrated image including a plural types of image elements.

According to the present invention, the apparatus comprises: (a) means for inputting: respective image data representing image elements in respective resolutions and in respective data length for each pixel; and positions of the image elements on an image plane on which an integrated image is to be defined; (b) means for dividing the image plane into a plurality of regions; (c) means for serially selecting one of the plurality of regions to obtain a selected region; (d) means for determining what image elements are included in the selected region, to thereby specify objective image elements; (e) means for determining maximum resolution and maximum data length within respective resolutions and data length of the objective image elements; (f) processor means for integrating on the selected region the objective image elements in the maximum resolution and in the maximum data length to obtain a part of an integrated image data representing a part of the integrated image defined on the selected region; (g) memory means for storing respective parts of an integrated image data; and (h) means for reading the respective parts of an integrated image data out of the memory means to output the respective parts of the integrated image data.

The memory means may include a plurality of image frame memories used for storing respective parts of the integrated image data obtained through different image-integration modes.

Since image-integration on respective regions on the image plane are carried out in respective optimum modes, the efficiency in the image-integration is improved.

Accordingly, an object of the present invention is to generate an integrated image of characters, diagrams and pictures at a high efficiency.

Another object of the present invention is to generate a halftone dot image without a complex transformation processing of coordinates in a dot generator even if respective image regions are not rectangular.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3(a) through 3(c) are conceptual diagrams showing the size of a pixel and the data length of an image data for one pixel in respective processing modes;

DETAILED DESCRIPTION OF THE PREFERRED EMBODIMENT

Figure 1:
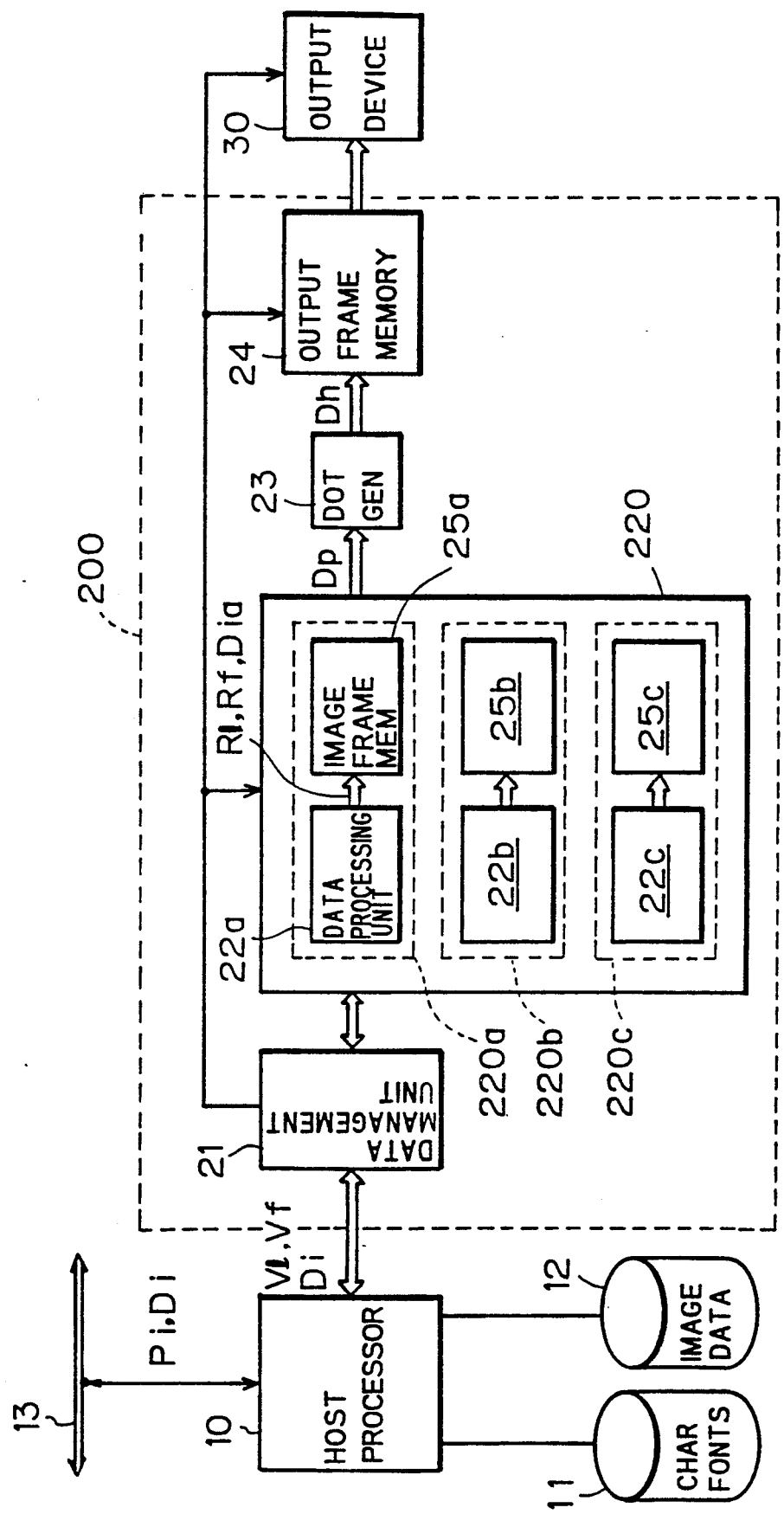
FIG. 1 is a block diagram showing an image processing system comprising an image integrating device according to a preferred embodiment of the present invention.

FIG. 1 is a block diagram showing an image processing system comprising an image integrating device 200 according to a preferred embodiment of the present invention. In addition to the image integrating device 200, the image processing system has a host processor 10, a character font disc 11, an image data memory 12 and an output device 30.

The image integrating device 200 has a data management unit 21, an image processing unit 220, a dot generator 23 and an output frame memory 24. The image processing unit 220 has three image processing modules 220a through 220c. Furthermore, the image processing modules 220a through 220c have data processing units 22a through 22c and image frame memories 25a through 25c, respectively.

In those components, the image frame memories 25a through 25c are elements characterizing the present invention. The image frame memories 25a through 25c are memories for storing image data of a binary high resolution image and a multivalued high resolution image in accordance with a selected mode mentioned later, each of which memories has a capacity of 8 MB (mega bites) or $8 \times 8 = 64$ mega bits, for example. The capacity of each memory 25a, 25b, 25c is represented by a symbol $A_t$ (not shown in the drawings). Details of the memories 25a–25c will be described later.

As the host processor 10, a so-called engineering work station and a personal computer may be employed. The host processor 10, as in the prior art, receives an image description program $P_i$ and multi-tone image data $D_i$ from an external device through an external interface 13. The image description program $P_i$ represents characters and diagrams, while the multi-tone image data $D_i$ represents multi-tone pictures. Respective positions of the characters, the diagrams and the pictures on an image plane may be designated in the image description program $P_i$ and the multi-tone image data $D_i$, or alternatively, they may be designated by inputting another data defining them. The characters, the diagrams and the pictures are image elements to be integrated on the image plane.

The host processor 10 decodes the image description program $P_i$ to obtain a character vector data $V_l$ and a diagram vector data $V_f$ and temporarily stores multi-tone image data $D_i$ in the image data memory 12. Characters in the image description program $P_i$ are designated in the form of character font codes, and therefore, the host processor 10 produces the character vector data $V_l$ based upon vector data of character fonts stored in the character font disc 11 and the character font codes in the image describing program $P_i$.

The character vector data $V_l$, the diagram vector data $V_f$ and the multi-tone image data $D_i$ are transmitted from the host processor 10 to the data management unit 21 in the image integrating device 200. The data management unit 21 divides an image plane into a plurality of areas based upon these data.

Figure 2:
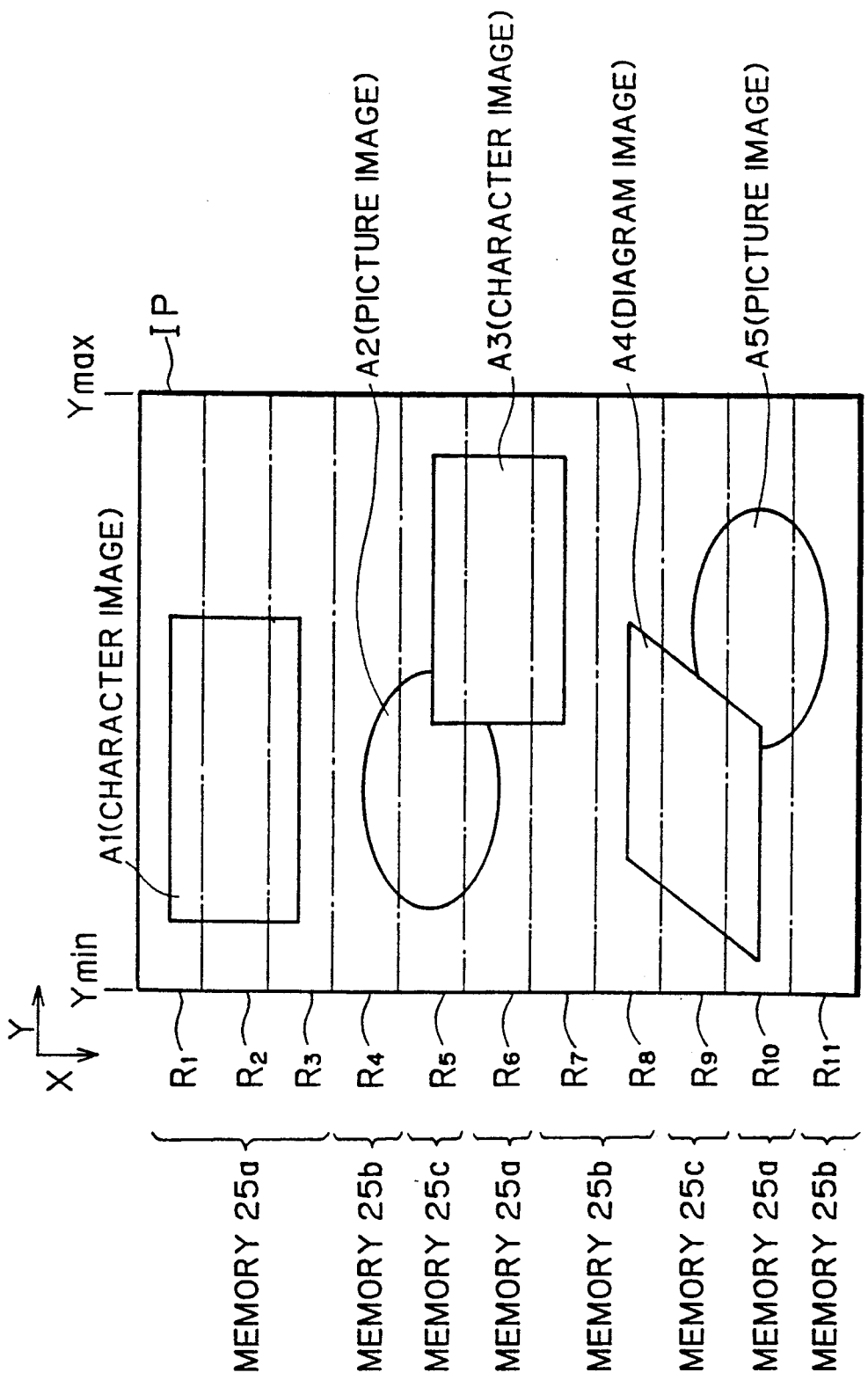
FIGS. 2 and 5 are conceptual diagrams showing a method of dividing a halftone dot image.

FIG. 2 conceptionally shows images on the image plane IP, which images are expressed by the image description program $P_i$ and the multi-tone image data $D_i$. In the image plane IP, there are five regions $A_1$ through $A_5$ in which characters, diagrams or patterns are arranged. In all of them, the regions $A_1$ and $A_3$ contain characters only, while the regions $A_2$ and $A_5$ contain photographs of pictures only. The region $A_4$ contains diagrams only. In FIG. 2, squares ($A_1$, $A_3$) show regions of characters, elipses ($A_2$, $A_5$) show regions of pictures, and a parallelogram ($A_4$) shows a region of a diagram or a line drawing. On the other hand, the image plane IP is divided into equal rectangular strip regions $R_1$ through $R_{11}$. As described later, each strip region has a predetermined dimensions and the image processing unit 220 executes an image processing to each of the strip regions $R_1$ through $R_{11}$.

Ordinarily, characters and diagrams (line drawings) can be expressed by binary data, and they are expressed at a high resolution (e.g., 1500 dpi) to reproduce their shapes clearly. On the other hand, patterns are expressed by multivalued data (8 bit data in this preferred embodiment), and they are generally expressed with low resolution (e.g., 300 dpi). Then, the data management unit 21 judges which mode in the following three modes images in each strip region should be processed in.

(I) Mode 1: A mode for procesing a binary high resolution image data of an image including characters and/or diagrams (line drawings) only. In this Mode 1, the size of each pixel is 1500 dpi (dots per inch) and the image data for each pixel is represented by 1 bit. The image frame memory 25a, 25b or 25c is used for storing image data for 64M (mega) pixels.

(II) Mode 2: A mode for processing a multivalued low resolution image data of an image including patterns only. The size of each pixel is 300 dpi and the image data for each pixel is represented by 8 bit. The image frame memory 25a, 25b or 25c is used for storing image data for 8M pixels.

(III) Mode 3: A mode for processing a multivalued high resolution image data of an image including characters and/or diagrams as well as patterns. The size of each pixel is 1500 dpi and the image data for each pixel is represented by 8 bit. The image frame memory 25a, 25b or 25c is used for storing image data for 8M pixels.

The procedures for processing images in a selected one of these modes are previously stored in the data management unit 21 in the form of software programs.

In general, when the symbols $P_j$, $N_j$ and $S_j$ (j=1,2,3) are introduced in accordance with the following definition (i) through (iii), these values $P_j$, $N_j$ and $S_j$ are so selected that the following expressions (1) through (4) are held.

(i) $P_j$: the number of pixels stored in the image frame memory;

(ii) $N_j$: the data length or the number of bits in representing each pixel;

(iii) $S_j$: resolution in dpi.

$$P_j \times N_j \leq M_t (j=1,2,3) \tag{1}$$

$$P_1 > P_2 = P_3 \tag{2}$$

$$N_1 < N_2 = N_3 \tag{3}$$

$$S_1 = S_3 \geq S_2 \tag{4}$$

Preferably, the values $P_j$, $N_j$ and $S_j$ (j=1,2,3) are so selected that the following expressions (5) is held in place of the expression (1).

$$P_j \times N_j = A_t (i=1,2,3) \tag{5}$$

In the preferred embodiment, values $N_c$, $N_d$, $N_p$, $S_c$, $S_d$ and $S_p$ are defined in the expressions (6) through (11) and the values $P_j$, $N_j$ and $S_j$ (j=1,2,3) are determined in the following expressions (12) through (20), as understood from the above-indicated definition (I), (II) and (III) of the Modes 1–3.

$$N_c = \text{the number of bits for each pixel suitable for expressing characters} = 1 \text{ bit} \tag{6}$$

$$N_d = \text{the number of bits for each pixel suitable for expressing diagrams} = 8 \text{ bits} \tag{7}$$

$$N_p = \text{the number of bits for each pixel suitable for expressing pictures} = 8 \text{ bits} \tag{8}$$

$$S_c = \text{the resolution suitable for expressing characters} = 1500 \text{ dpi} \tag{9}$$

$$S_d = \text{the resolution suitable for expressing diagrams} = 1500 \text{ dpi} \tag{10}$$

$$S_p = \text{the resolution suitable for expressing pictures} = 300 \text{ dpi} \tag{11}$$

$$N_1 = \text{maximum value in } (N_c, N_d) = \text{maximum value in } (1 \text{ bit}, 1 \text{ bit}) = 1 \text{ bit} \tag{12}$$

$$N_2 = \text{maximum value in } (N_p) = N_p = 8 \text{ bits} \tag{13}$$

$$N_3 = \text{maximum value in } (N_c, N_d, N_p) = \text{maximum value in } (1 \text{ bit}, 1 \text{ bit}, 8 \text{ bits}) = 8 \text{ bits} \tag{14}$$

$$S_1 = \text{maximum value in } (S_c, S_d) = \text{maximum value in } (1500, 1500) = 1500 \text{ bpi} \tag{15}$$

$$S_2 = \text{maximum value in } (S_p) = R_p = 300 \text{ bpi} \tag{16}$$

$$S_3 = \text{maximum value in } (S_c, S_d, S_p) = \text{maximum value in } (1500, 1500, 300) = 1500 \text{ bpi} \tag{17}$$

$$P_1 = A_t/N_1 = (64M \text{ bits})/(1 \text{ bit}) = 64M \text{ pixels} \tag{18}$$

$$P_2 = A_t/N_2 = (64M \text{ bits})/(8 \text{ bits}) \tag{19}$$

-continued

= 8M pixels $$P_3 = A_t/N_3 \quad (20)$$
$$= (64M \text{ bits})/(8 \text{ bits})$$
$$= 8M \text{ pixels}$$

Although images of characters and diagrams are represented in the form of binary monochrome images in many cases, they may be represented in the form of multi-tone images in which one or more arbitrary colors are designated. Such a multivalued image is processed in the Mode 3 even if it is an image including characters and/or diagrams only.

FIGS. 3(a) through 3(c) are diagrams showing a concept of the image data for each pixel in the Modes 1 through 3, respectively. The heights of rectangular poles in FIGS. 3(a) through 3(c) show the numbers of bits in the image data for each pixel, while widths of their bottoms and tops show dimensions of a single pixel. Since the size of a single pixel is 1500 dpi in the Modes 1 and 3, the width of the bottom of each rectangular pole is about 17 $\mu$m. On the other hand, since a single pixel is 300 dpi in the Mode 2, the width of the bottom of the pole is about 85 $\mu$m.

Figure 4A:
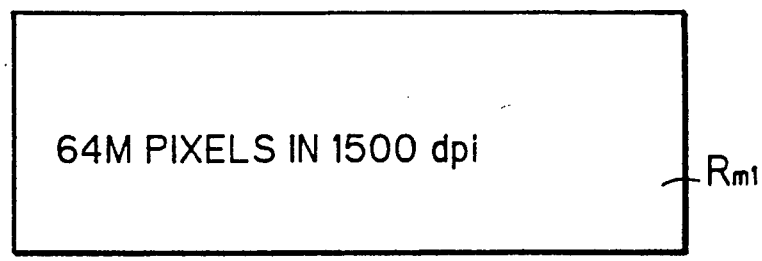
FIGS. 4(a) through 4(c) are diagrams showing the dimensions of an image which can be accommodated in a single image frame memory in respective processing modes.
Figure 4B:
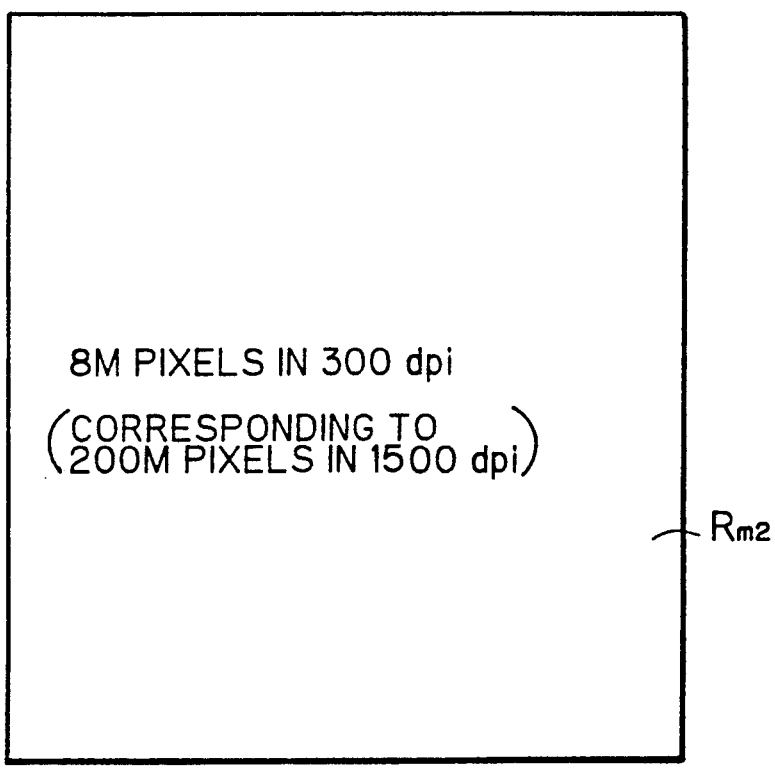
Figure 4C:
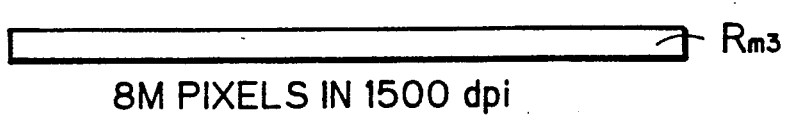

FIGS. 4(a) through 4(c) are diagrams relatively showing the dimensions of image areas which can be stored in each image frame memory 25a, 25b, 25c of 8M bite under respective modes. In the Mode 1, each frame memory 25a, 25b, 25c can store image data of an image region $R_{m1}$ including 64M (=65536) pixels of 1500 dpi. In the Mode 2, each frame memory 25a, 25b, 25c can store image data of an image region $R_{m2}$ including 8M (=8192) pixels of 300 dpi. The image region $R_{m2}$ has an area equal to that of a region including 200M pixels of 1500 dpi. In the Mode 3, each frame memory 25a, 25b, 25c can store image data of an image region $R_{m3}$ including 8M pixels of 1500 dpi. The area rate of the three image regions $R_{m1}$ through $R_{m3}$ is 8:25:1. In other words, the image region $R_{m3}$ which can be stored in each frame memory 25a, 25b, 25c in Mode 3 is dimensionally smallest of the image regions $R_{m1}$ through $R_{m3}$ which may be stored in any of the modes 1 through 3. The image $R_{m3}$ is ⅛ of the image region $R_{m1}$ in the Mode 1 and 1/25 of the image region $R_{m2}$ in the Mode 2. Areas of the strip regions $R_1$ through $R_{11}$ shown in FIG. 2 are set equal to an area of the image region $R_{m3}$ in FIGS. 4(a) through 4(c). In this way, when a strip region including pictures as well as character and/or diagrams is processed in the Mode 3, the image data of the strip region can be stored in one of the image frame memories 25a-25c. Eight of strip regions including characters and/or diagrams but no pictures can be stored in one of the image frame memories 25a-25c at a time. Furthermore, twenty-five of strip regions including pictures only can be stored in one of the image frame memories 25a-25c at a time.

The data management unit 21 determines a processing mode among the Modes 1 through 3 so that an integrated image is generated in the image frame memory in accordance with the highest resolution and the largest number of bits in the image data of images contained in the strip regions $R_1$ through $R_{11}$. The image data for the strip regions $R_1$ through $R_3$, $R_7$ and $R_8$ are processed in the Mode 1. The strip regions $R_4$ and $R_{11}$ are processed in the Mode 2, while the strip regions $R_5$, $R_6$, $R_9$ and $R_{10}$ are processed in the Mode 3.

The image frame memories 25a-25c are prepared so that arbitrary one of various integrated images can be written in a corresponding image frame memory.

After the determination of the mode of each strip region in the data management unit 21 is completed, the image processing unit 220 generates respective parts of an integrated image in the strip regions $R_1$ through $R_{11}$ based upon the character vector data $V_l$, the diagram vector data $V_f$ and the multi-tone image data $D_i$ in accordance with instructions of the data management unit 21 in the following manner and stores the same in the image frame memories 25a through 25c.

The character vector data $V_l$ in the strip region $R_1$ is supplied from the data management unit 21 to the image processing unit 220. The character vector data $V_l$ is processed in the data processing unit 22a of the image processing module 220a. The data processing units 22a through 22c are so-called second generation graphic controller LSIs, which perform a coordinate transformation processing, such as an enlargement, reduction, rotation and the like, to the vector data $V_l$ and $V_f$ and the multi-tone image data $D_i$ and has a function to transform the vector data $V_l$ and $V_f$ into raster data $R_l$ and $R_f$.

Furthermore, the part of the integrated image on the strip region $R_1$ is generated on the basis of the raster data $R_l$ and $R_f$ as well as the multi-tone image data $D_{ia}$, after the transformation. This portion of the integrated image is stored, or drawn, in the image frame memory 25a. Since the strip region $R_1$ contains characters only, the image drawing is done based simply upon the character raster data $R_l$. Since the strip region $R_1$ is processed in accordance with the Mode 1, the image frame memory 25a is used as a frame memory of 64M pixels×1 bit, where each one pixel corresponds to 1500 dpi. The strip regions $R_2$ and $R_3$ as well as the strip region $R_1$ are processed in accordance with the Mode 1. As previously mentioned, image data on eight of the strip regions obtained through the processing of Mode 1 can be stored in one image frame memory at a time. Therefore, the image data in the strip regions $R_1$ through $R_3$ can be stored in the image frame memory 25a at a time.

The strip region $R_4$ is processed in the Mode 2 because it includes pictures only. The Mode 2 for the strip region $R_4$ is different from the Mode 1 for the strip regions $R_1$ through $R_3$, and therefore, as shown in FIG. 2, an image data in the strip $R_4$ is stored in the next image frame memory 25b. At this time, the multi-tone image data $D_{ia}$ in the strip region $R_4$ is applied to the data processing unit 22b of the image processing module 220b for coordinate transformation and thereafter is stored in the image frame memory 25b. Thus, when a processing mode for strip regions is changed, an image processing module for storing the image part obtained is also changed, whereby images of different modes cannot exist in any one of image frame memories 25a-25c.

The strip region $R_5$ includes characters and pictures. The data management unit 21 detects that the rectangle region $R_5$ includes characters and pictures and decides to process the data thereof in the Mode 3. This processing mode (Mode 3) is different from the processing mode (Mode 2) for the prior strip region $R_4$, and hence, the character vector data $V_l$ and the multi-tone image data $D_i$ in the strip region $R_5$ are processed by the third data processing module 220c. The data processing unit 22c in the data processing module 220c processes the character vector data $V_l$ and the multi-tone image data $D_i$ in the strip region $R_5$ and draws the part of the integrated image in the image frame memory 25c. Since the processing of the strip region $R_5$ is carried out in accordance with the Mode 3, the image memory 25a is used as a frame memory of 8M pixels × 8 bit, in which each pixel corresponds to 1500 dpi. As to a part of the strip region $R_5$ where a character and a picture overlap each other, it is designated in the image description program under instructions of an operator which image priority should be given to (i.e., which image should be visible). The data processing unit 22c integrates respective images of the character and the picture in the strip region $R_5$ and stores an image data of the integrated image in the image frame memory 25c. On the integration, a data in a part where a character (or a diagram) in the character image (or a diagram image) should be solid or filled is provided with the maximum value "255" within values that can be expressed with 8 bit, while a data in a part where it should keep blank is provided with the minimum value "0".

The strip region $R_6$, similar to the strip region $R_5$, is processed in the Mode 3. However, since the image frame memory 25c is full of image data of the strip region $R_5$, the data processing unit 22a in turn performs a processing for the region $R_6$. That is, the data processing unit 22a integrates images of characters and patterns, and an image data of the integrated image thus obtained is stored in the image frame memory 25a.

When or before the image data in the region $R_6$ is stored in the image frame memory 25a, the image data in the strip regions $R_1$ through $R_3$ is read from the image frame memory 25a and converted into halftone dots in the dot generator 23. In other words, the image processing modules 220a through 220c including the image frame memories 25a through 25c, respectively are cyclically employed for generating respective parts of the integrated image in the strip regions $R_1$ through $R_{11}$ on the image plane IP. Shift from one image frame memory to another image frame memory for storing a part of the integrated image newly generated is carried out every time when the one image frame memory is full of image data as shown in the above and every time when the mode in the generation of the integrated image is changed from one strip region to the next strip region.

The image data for the other strip regions $R_7$ through $R_{11}$ are generated similar to the above. That is, the image data for the strip regions $R_7$ and $R_8$ are processed in the Mode 1 and stored in the image frame memory 25b. The strip regions $R_9$ and $R_{10}$ are processed in the Mode 3 while the strip region $R_{11}$ is processed in the Mode 2, and their respective image data are stored in the image frame memories 25c, 25a and 25b, respectively.

The image data $D_p$ of each pixel in each strip region is temporarily stored in corresponding one of the image frame memories 25a through 25c and is transmitted to the dot generator or halftone dot generating unit 23. At this time, the image data $D_p$ stored in the image frame memories 25a through 25c are those for the image plane including areas where no character, no diagram and no pattern is provided, i.e., areas other than regions $A_1$ through $A_5$ shown in FIG. 2. The image data $D_p$ is serially read out from the head coordinate Ymin to the end coordinate Ymax on each scanning line along a main scanning direction Y, while selection of scanning lines is serially conducted in respective strip regions along a subscanning direction Y.

The dot generator 23 compares the image data with threshold values to generate a halftone dot image data (binarized image data) $D_h$ expressing a binary brightness level or ON/OFF of each pixel in 1 bit. The size of respective pixels is determined in accordance with resolution (e.g., 1500 dpi) in an output device 30. When the output device 30 is an image scanner, the resolution in the output device 30 corresponds to the recording resolution of light beams provided for exposing a photosensitive material. The halftone dot image data $D_h$ has a data structure corresponding to a screen whose line density is selected from the range 65 per inch to 175 per inch and whose screen angle is 0°, 15°, 45° or 75°, for example.

However, the dot generator 23 is not a simple dot generator but an improved one which is operable to discriminate respective modes assigned for the strip regions $R_1$–$R_{11}$, and changes the type of the data conversion. Details of the generation are as follows:

Strip Regions in Mode 1

The image data $D_p$ applied from the image frame memory 25a through 25c to the dot generator 23 is expressed in 1 bit for each pixel corresponding to 1500 dpi. Hence, the pixel size in the image data $D_p$ is the same as the size of recording pixels, and the image data $D_p$ is transmitted to the output frame memory 24 as the halftone dot image data $D_p$ without substantial processing in the dot generator 23.

Strip Regions in Mode 2

The image data $D_p$ is expressed in 8 bit under the condition that each pixel corresponds to 300 dpi. Since the size of the exposure light beams is 1500 bpi, it is required to re-assign the image data $D_p$ to pixels of 1500 bpi. Then, the dot generator 23 conducts a processing for regarding each pixel in the image data $D_p$ as a cluster of 25 pixels in the output device 30. More particularly, clock signals in the dot generator 23 are modified so that five pixels in each scanning direction X and Y are assigned to each pixel in the image data $D_p$, whereby each pixel in the image data $D_p$ is converted into a cluster of $5 \times 5 = 25$ output pixels of 1500 dpi. Under the conversion of pixels, the image data $D_p$ is compared with the threshold values representing screen pattern to generate the halftone dot image data $D_h$. The threshold values or screen pattern data are previously stored in a screen pattern memory SPM (not shown) and are read from the SPM in the serial order of scanning lines in accordance with the condition that the image data $D_p$ is read from the image frame memory in the order of scanning lines. Distribution of the threshold values in each halftone dot area and the structure for comparing image data with the same are well-known in the art, and are disclosed in Japanese Patent Laid-Open Gazette No. 63-212273 (1988), for example.

Strip Regions in Mode 3

The image data $D_p$ is expressed in 8 bit, and each pixel corresponds to 1500 dpi. Thus, the image data $D_p$ is directly compared with the threshold values or screen pattern data, whereby the halftone dot image data $D_h$ is generated.

The halftone dot image $D_h$ generated in the dot generator 23 is temporarily stored in the output frame memory 24 and then outputted to the output device 30 to record a halftone dot integrated image. The output frame memory 24 has a capacity of 64 MB, for example, and is capable of storing the halftone dot image data $D_h$ for the image plane PL. The output device 30 may be a drum-type output scanner, and a halftone dot image is recorded as a latent image on a photosensitive film.

In this way, in the above preferred embodiment, a processing mode of each strip region is determined in accordance with the type of image elements (characters, diagrams, pictures, etc.) included in each of strip regions, and the type of process in generating respective parts of an integrated image and in storing the same in the image frame memories 25a through 25c is changed in accordance with the mode given to each strip region. Therefore, there is an advantage that the image frame memories can be efficiently used. This advantage can be more clearly understtod, compared with the case where all strip regions are processed in the Mode 3 and all the image frame memories are used in agreement with the Mode 3. In this case, as a strip region including characters only is also processed in the Mode 3, the size of a region which can be stored in one image frame memory is only ⅛ of that when the strip region is processed in the Mode 1. In other words, in the above preferred embodiment, an image of a region eight times as large as an image in the above-indicated reference case can be stored in each image frame memory. Hence, the image frame memories are efficiently used and a processing is performed at high speed.

In generating an integrated image of characters, diagrams and/or patterns, even if regions separately allocated are not rectangular in shape, there is no need of performing a complex coordinates transformation processing to find out locations of the non-rectangular regions on the image plane through computations in the dot generator 23. Consequently, the halftone dot image data $D_h$ can be easily obtained.

The following are examples of modification in the present invention.

Figure 5:
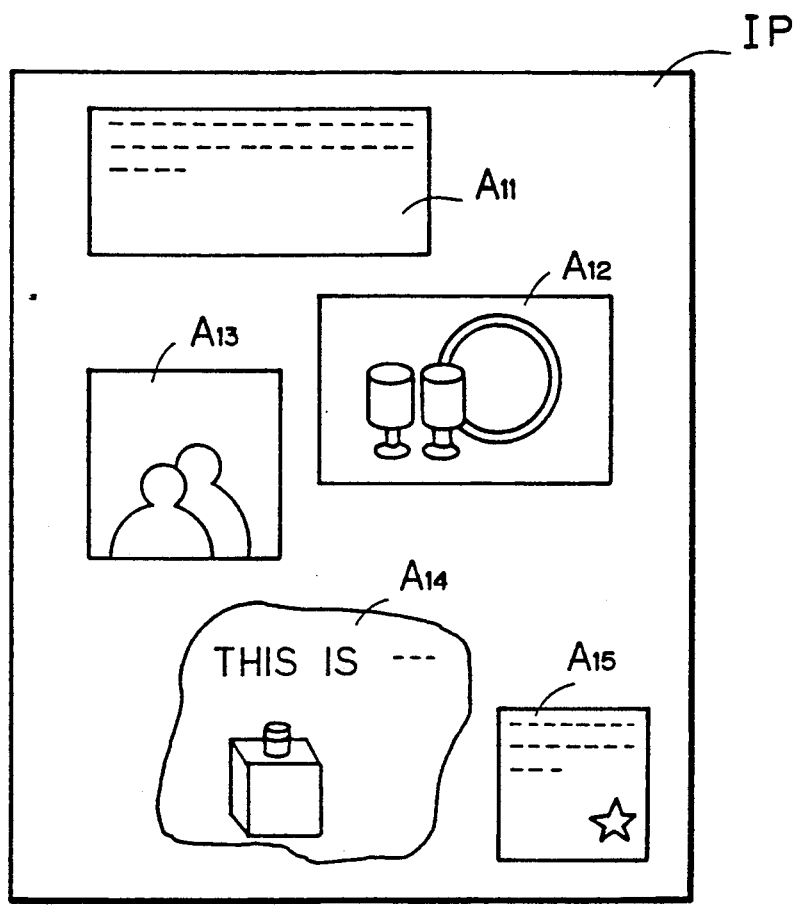
Figure 6:
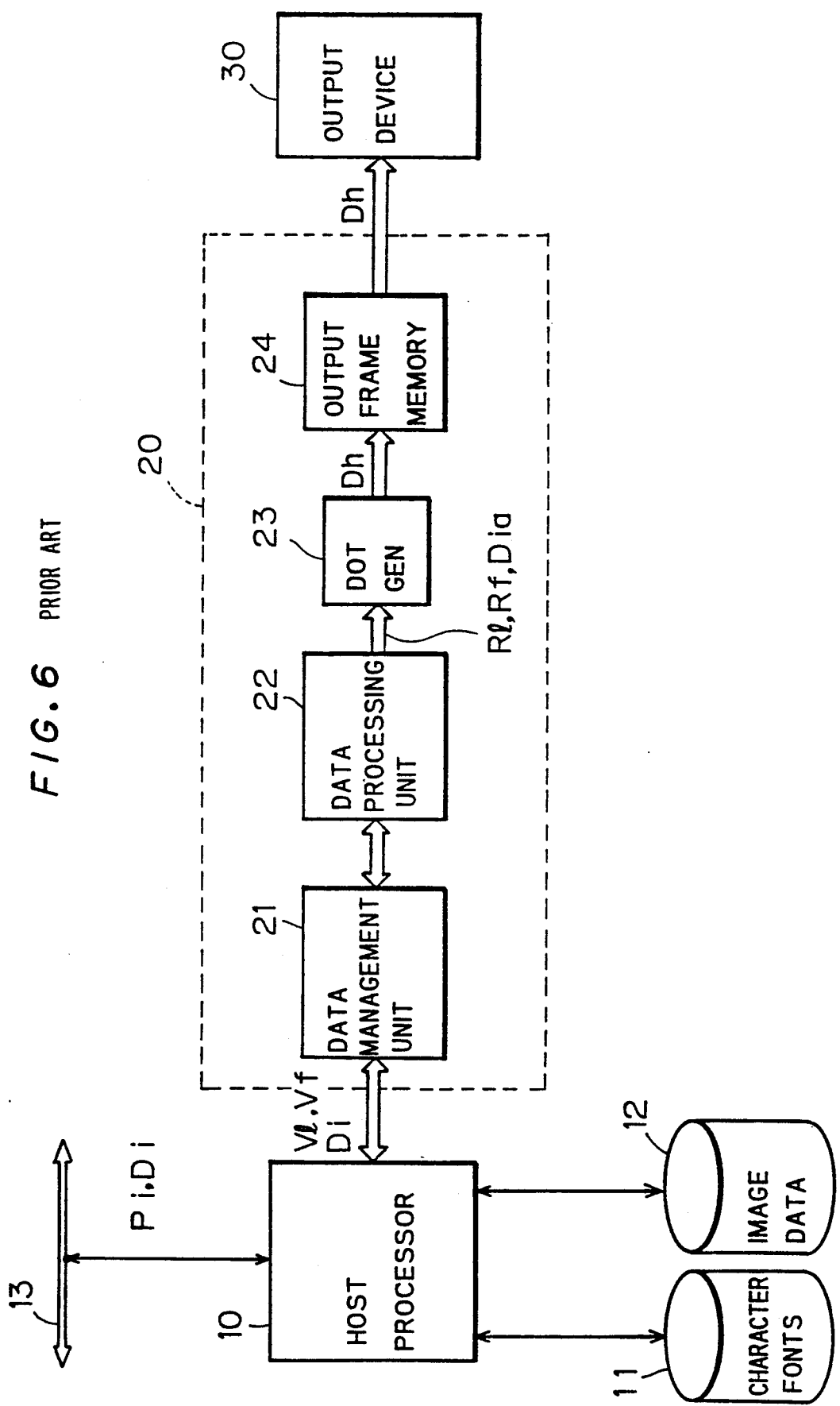
FIG. 6 is a block diagram showing a conventional image processing system.

(1) As shown in FIG. 5, the image plane IP may be divided into regions $A_{11}$ through $A_{15}$ having arbitrary shapes and arbitrary positions. In FIG. 5, the regions $A_{11}$ and $A_{15}$ include characters, while the regions $A_{12}$ and $A_{13}$ include pictures. Further, the region $A_{14}$ includes characters and pictures. When such an arbitrary division of the image plane IP is employed, an operator designates locations and contours of the regions $A_{11}$ through $A_{15}$ on the image plane IP in advance, and the data indicating the same is inputted to the host processor 10 or the data management unit 21. A processing mode of each of the regions $A_{11}$ through $A_{15}$ divided in this way is determined similar to the above prefereed embodiment, and a processing in accordance with the mode is performed.

(2) The present invention can be effectuated through use of at least one image processing module. When only one image processing module is employed, respective regions on the image plane may be serially processed in corresponding one of the Modes 1 through 3 using the one image processing module. However, using a plurality of image processing modules are employed as in the preferred embodiment to perform a parallel processing, the processing in the image integrating device 200 can be advantageously performed at higher speed. The image processing modules may be put on a single board so that additional modules can be built as required.

(3) As slready described, the data processing units 22a through 22c in the image processing modules 220a through 220c perform a coordinate transformation (affine transformation), such as an enlargement, reduction, rotation, etc., of an image and transforms a vector data into a raster data to draw an image in each of the image frame memories 25a through 25c. However, if a plurality of image processing modules are prepared, at least one of them may be used as a preprocessor dedicated to a coordinate transformation processing. In this case, in the image processing module used as a preprocessor, an image after the coordinate transformation is written in one image frame memory, and the other image processing modules read out the image after coordinate transformation to perform a processing other than the coordinate transformation and to write the processed image in the image frame memories associated therewith. Thus, if the coordinate transformation processing is performed by the dedicated image processing module, a processing speed in the image integrating device 200 can be further improved.

(4) One of the image processing modules may be employed as a character font cache memory. In this case, character fonts which appear on the image plane many times may be supplied from the host processor 10 to an image processing module used as a character font cache memory, and the character fonts may be stored in an image frame memory in the image processing module. In this way, when one image processing module is used as a character font cache memory, the number of times character fonts are read out from the character font disc 11 can be reduced, and the processing can be carried out at a higher speed.

(5) An output frame memory 24 does not have to cover the whole image plane. When the output device 30 has a function of a halt and resumption in output recording, the output frame memory 24 can be omitted.

(6) The present invention is effective even if the image elements include only pictures and one of characters and pictures. Furthermore, the present invention can be applied to the case where image elements other than characters, diagrams and pictures are included.

While the invention has been shown and described in detail, the foregoing description is in all aspects illustrative and not restrictive. It is therefore understood that numerous modifications and variations can be devised without departing from the scope of the invention.

I claim:

1. A method of generating an integrated image including plural types of image elements on an image plane comprising a two-dimensional array of pixels, comprising the steps of:

(a) obtaining respective image data representing respective image elements in respective resolutions and in respective data length for each pixel;

(b) designating positions of said image elements on said image plane;

(c) dividing said image plane into a plurality of regions (d) selecting one of said plurality of regions to obtain a selected region;

(e) determining what types of image elements are included in said selected region, to thereby specify objective image elements;

(f) determining maximum resolution and maximum data length within respective resolutions and data lengths of said objective image elements;

(g) integrating on said selected region said objective image elements in said maximum resolution and in said maximum data length to obtain a part of an integrated image data representing a part of said integrated image defined on said selected region; and (h) repeating the steps (d) through (g) while serially changing said selected region within said plurality of regions, to thereby obtain integrated image data representing the whole of said integrated image on said image plane.

2. The method of claim 1, further comprising the step of:

(i) prior to the step (a), determining a plurality of image-integration modes characterized by different resolutions and different data length;

wherein the step (g) comprises the steps of:

(g-1) selecting one of said plurality of image-integration modes in accordance with said maximum resolution and said maximum data length, to thereby specify a selected image-integration mode; and (g-2) integrating on said selected region said objective image elements in said selected image-integration mode to obtain said part of said integrated image data.

3. The method of claim 2, wherein said image elements are classified into a plurality of image types including multi-tone image type and binary image type; and the step (i) comprises the steps of:

(i-1) determining a first image-integration mode characterized by a first resolution and a first data length for each pixel;

(i-2) determining a second image-integration mode characterized by a second resolution and a second data length for each pixel; and (i-3) determining a third image-integration mode characterized by a third resolution and a third data length for each pixel, wherein each of said first and third resolutions are higher than said second resolution; and each of said second and third data length are longer than said first data length.

4. The method of claim 3, wherein said image elements of said multi-tone image type include a picture image element representable in said second resolution and said second data length for each pixel; and said image elements of said binary image type include at least one of a character image element and a diagram image element representable in said first resolution and said first data length for each pixel.

5. The method of claim 4, further comprising the step of:

(j) converting said integrated image data into a binarized and integrated image data representing said integrated image in binary dots.

6. The method of claim 5, wherein the step (j) comprises the step of:

(j-1) with respect to a part of said integrated image obtained through either of said second and third image-integration modes, comparing said integrated image data with threshold values to generate halftone dot image data representing a halftone dot image as a part of said binarized and integrated image data.

7. The method of claim 6, wherein the step (j1) comprises the step of:

with respect to a part of said integrated image obtained through said second image-integration mode, comparing said integrated image data with said threshold values while assigning said integrated image data to a plurality of pixels each having a size previously determined in accordance with recording resolution in an image recording device.

8. The method of claim 7, further comprising the step of:

(k) prior to the step (a), preparing a plurality of image frame memory means;

wherein the step (g) further comprises the steps of;

(g-3) designating one of said plurality of image frame memory means to specify an objective image frame memory mean; and (g-4) storing said part of an integrated image data in said objective image frame memory means.

9. The method of claim 8, wherein the step (g) further comprises the step of;

(g-5) changing designation of said objective image frame memory means every time when said image-integration mode selected in the step (g-1) for a currently selected region is different from that for a region selected in a previous repetition in the step (h).

10. The method of claim 9, wherein the step (g) further comprises the step of;

(g-6) changing said designation of said objective image frame memory means to another image frame memory means among said plurality of image frame memory means every time when said objective image frame memory means is filled with parts of said integrated image data.

11. The method of claim 10, wherein the step (c) comprises the step of;

(c-1) dividing said image plane into a plurality of rectangular strip regions regardless of said positions of said image elements on said image plane.

12. The method of claim 10, wherein the step (c) comprises the step of;

(c-1) dividing said image plane into a plurality of areas in accordance with distribution of said image elements on said image plane.

13. The method of claim 1, wherein said step (f) comprises determining the maximum resolution and maximum data length within respective resolutions and data lengths of said objective image elements in said selected region.

14. An apparatus for generating an integrated image including a plural types of image elements on an image plane including a two-dimensional array of pixels, comprising (a) means for inputting: respective image data representing image elements in respective resolutions and in respective data length for each pixel; and positions of said image elements on said image plane;

(b) means for dividing said image plane into a plurality of regions;

(c) means for serially selecting one of said plurality of regions to obtain a selected region;

(d) means for determining what types of image elements are included in said selected region, to thereby specify objective image elements;

(e) means for determining maximum resolution and maximum data length within respective resolutions and data lengths of said objective image elements;

(f) processor means for integrating on said selected region said objective image elements in said maximum resolution and in said maximum data length to obtain a part of an integrated image data representing a part of said integrated image defined on said selected region;

(g) memory means for storing respective parts of an integrated image data; and (h) means for reading said respective parts of an integrated image data out of said memory means to output said respective parts of said integrated image data.

15. The apparatus of claim 14, wherein said processor means comprises:

(f-1) means for holding procedures for a plurality of image-integration modes characterized by different resolutions and different data length;

(f-2) means for selecting one of said plurality of image-integration modes in accordance with said maximum resolution and said maximum data length, to thereby specify a selected image-integration mode; and (f-3) means for integrating on said selected region said objective image elements in said selected image-integration mode to obtain said part of said integrated image data.

16. The apparatus of claim 15, wherein said image elements are classified into a plurality of image types including multi-tone image type and binary image type; and said plurality of said image-integration modes includes:

a first image-integration mode characterized by a first resolution and a first data length for each pixel;

a second image-integration mode characterized by a second resolution and a second data length for each pixel; and a third image-integration mode characterized by a third resolution and a third data length for each pixel wherein each of said first and third resolutions are higher than said second resolution; and each of said second and third data lengths are longer than said first data length.

17. The apparatus of claim 16, wherein said image elements of said multi-tone image type include a picture image element representable in said second resolution and said second data length for each pixel; and said image elements of said binary image type include at least one of a character image element and a diagram image element representable in said first resolution and said first data length for each pixel.

18. The apparatus of claim 17, further comprising:

(i) means for converting said integrated image data into a binarized and integrated image data representing said integrated image in binary dots.

19. The apparatus of claim 18, wherein said means (i) comprises:

(i-1) means for, with respect to a part of said integrated image obtained through either of said second and third image-integration modes, comparing said integrated image data with threshold values to generate halftone dot image data representing a halftone dot image as a part of said binarized and integrated image data.

20. The apparatus of claim 19, wherein said means (i-1) comprises:

means for, with respect to a part of said integrated image obtained through said second image-integration mode, comparing said integrated image data with said threshold values while assigning said integrated image data to a plurality of pixels each having a size previously determined in accordance with resolution in an image recording device.

21. The apparatus of claim 20, wherein said memory means comprises:

(g-1) a plurality of image frame memory means; and said apparatus further comprises:

(j) means for designating one of said plurality of image frame memory means to store said part of an integrated image data in said one said plurality of image frame memory means to specify an objective image frame memory means.

22. The apparatus of claim 21, wherein said means (j) comprises;

(j-1) means for changing designation of said objective image frame memory means every time when said image-integration mode selected in said means (f-1) for a currently selected region is different from that for a region selected just before said currently selected region.

23. The apparatus of claim 22, wherein said means (j) further comprises;

(j-2) means for changing said designation of said objective image frame memory means every time when said objective memory means is filled with parts of said integrated image data.

24. The apparatus of claim 23, wherein said means (b) comprises;

(b-1) means for dividing said image plane into a plurality of rectangular strip regions regardless of said positions of said image elements on said image plane.

25. The apparatus of claim 23, wherein said means (b) comprises;

(b-1) means for inputting data for dividing said image plane into a plurality of areas in accordance with distribution of said image elements on said image plane.

26. The apparatus of claim 14, wherein said means for determining maximum resolution and maximum data length comprises means for determining the maximum resolution and maximum data length within respective resolutions and data lengths of said objective image elements in said selected region.

* * * * *